United States Patent
Shih et al.

(10) Patent No.: US 10,756,815 B2
(45) Date of Patent: Aug. 25, 2020

(54) FREE SPACE OPTICAL DATA TRANSMISSION USING PHOTODETECTOR ARRAY

(71) Applicant: Molex, LLC, Lisle, IL (US)

(72) Inventors: YuYun Shih, Newark, CA (US); Lee Cheung, Fremont, CA (US); Gongjian Hu, Fremont, CA (US)

(73) Assignee: Molex, LLC, Lisle, IL (US)

( * ) Notice: Subject to any disclaimer, the term of this patent is extended or adjusted under 35 U.S.C. 154(b) by 84 days.

(21) Appl. No.: 16/107,307

(22) Filed: Aug. 21, 2018

(65) Prior Publication Data

US 2019/0199438 A1    Jun. 27, 2019

Related U.S. Application Data

(60) Provisional application No. 62/549,617, filed on Aug. 24, 2017.

(51) Int. Cl.
| | |
|---|---|
| *H04B 10/69* | (2013.01) |
| *H04B 10/112* | (2013.01) |
| *H04B 10/50* | (2013.01) |
| *H04B 10/11* | (2013.01) |

(52) U.S. Cl.
CPC ......... *H04B 10/1121* (2013.01); *H04B 10/11* (2013.01); *H04B 10/503* (2013.01); *H04B 10/69* (2013.01)

(58) Field of Classification Search
CPC ......... H04B 10/60; H04B 10/69; H04B 10/11
See application file for complete search history.

(56) References Cited

U.S. PATENT DOCUMENTS

| | | | | |
|---|---|---|---|---|
| 2004/0086282 | A1* | 5/2004 | Graves | H04B 10/60 398/202 |
| 2006/0076473 | A1* | 4/2006 | Wilcken | H04B 10/1121 250/214 A |
| 2009/0123156 | A1* | 5/2009 | Son | H04B 10/1141 398/119 |
| 2011/0317048 | A1* | 12/2011 | Bai | H01L 27/1461 348/294 |

* cited by examiner

*Primary Examiner* — Thanh Luu
(74) *Attorney, Agent, or Firm* — Molex, LLC

(57) ABSTRACT

A free space optical communication system includes an optical receiver configured to receive a light beam from an optical transmitter wirelessly in free space. The optical receiver includes an array of photodetectors and an electrical circuit. The array of photodetectors is configured to receive the light beam and convert optical signals of the light beam into electrical current. The electrical circuit is electrically coupled to the array of photodetectors and is configured to combine electrical current from the photodetectors and output a voltage or current signal.

5 Claims, 4 Drawing Sheets

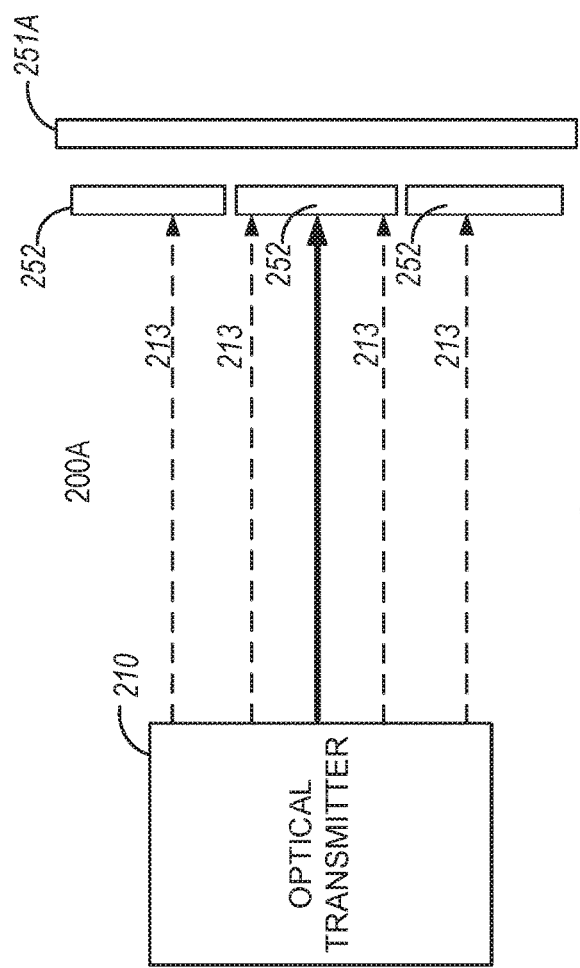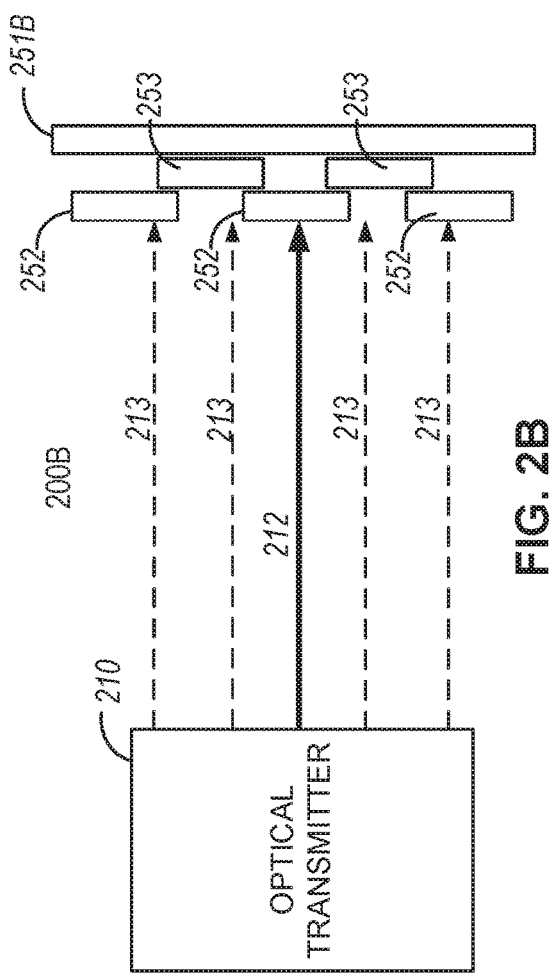

US 10,756,815 B2

FREE SPACE OPTICAL DATA TRANSMISSION USING PHOTODETECTOR ARRAY

RELATED APPLICATIONS

This application claims priority to U.S. Provisional Application No. 62/549,617, filed Aug. 24, 2017, which is incorporated herein by reference in its entirety

TECHNICAL FIELD

This disclosure relates to the field of data communication systems, more specifically to free space optical communication.

DESCRIPTION OF RELATED ART

Free-space optical links have been employed to communicate information optically without the use of optical fiber. A free-space link extends in a line of sight path between an optical transmitter and an optical receiver. Free-space optical links have the advantage of not requiring a physical installation of conductors.

However, a challenge for the current free space interconnect systems is alignment of the transmitter with the receiver. The system must be precisely aligned. The precise alignment must then be maintained during operation. The process of initial alignment can be difficult and cost prohibitive.

SUMMARY

In a first aspect, a free space optical communication system includes an optical receiver configured to receive a light beam from an optical transmitter wirelessly in free space. The optical receiver includes an array of photodetectors and an electrical circuit. The array of photodetectors is configured to receive the light beam and convert optical signals of the light beam into electrical current. The electrical circuit is electrically coupled to the array of photodetectors and is configured to combine electrical current from the photodetectors and output a voltage or current signal.

BRIEF DESCRIPTION OF THE DRAWINGS

The present application is illustrated by way of example and not limited in the accompanying figures in which like reference numerals indicate similar elements and in which:

FIG. 2A illustrates a simplified side view of a first example photodetector array of an optical receiver of the optical communication system;

FIG. 2B illustrates a simplified side of a second example photodetector array of an optical receiver of the optical communication system;

DETAILED DESCRIPTION

The detailed description that follows describes exemplary embodiments and the features disclosed are not intended to be limited to the expressly disclosed combination(s). Therefore, unless otherwise noted, features disclosed herein may be combined to form additional combinations that were not otherwise shown for purposes of brevity.

The present disclosure provides a system for communicating optical signals over free space with a high tolerance to misalignment between an optical transmitter and an optical receiver. The optical receiver uses an array of photodetectors and an electrical circuit to detect and convert optical signals received from the optical transmitter into voltage signals.

Figure 1:
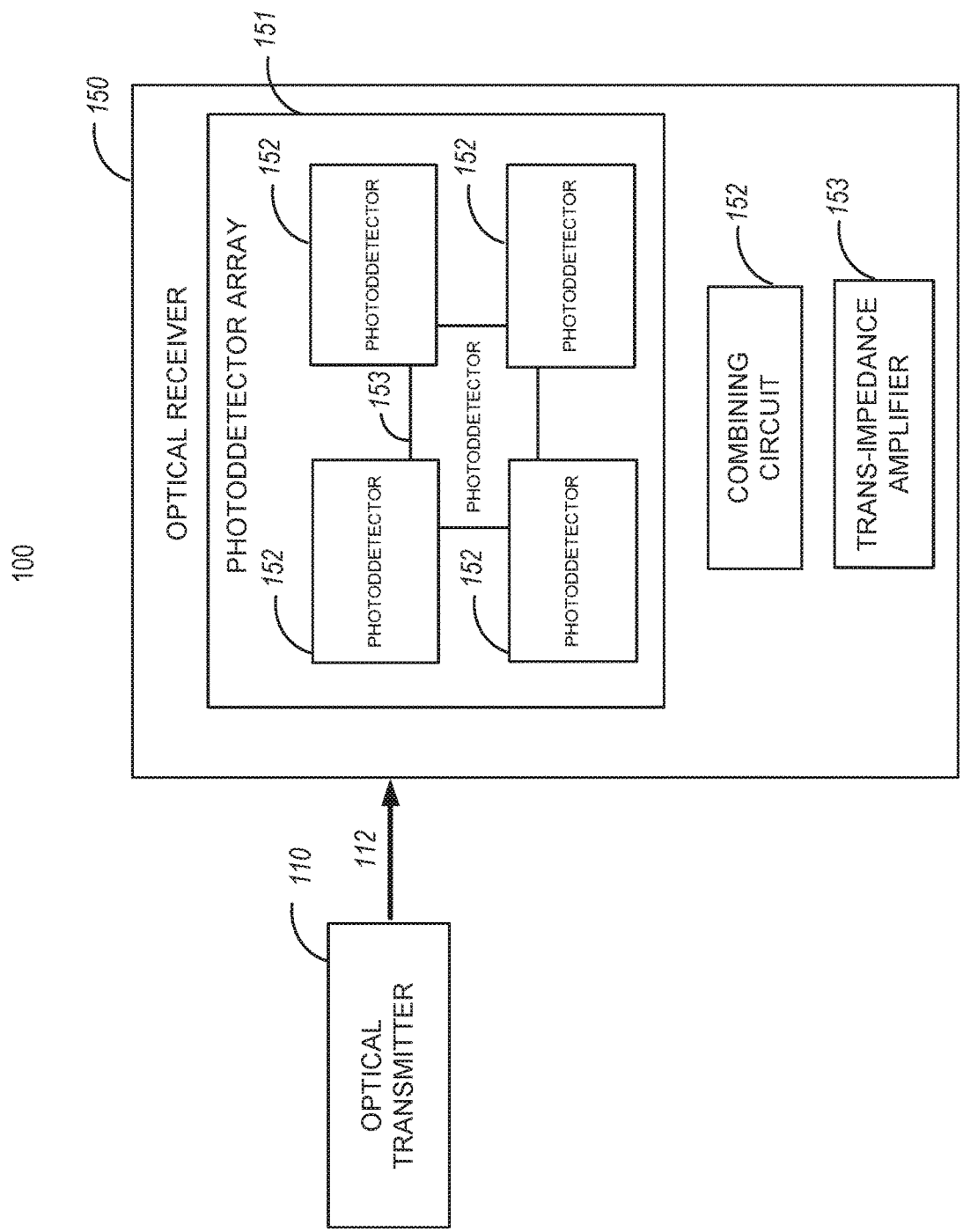
FIG. 1 illustrates a block diagram of an example free space optical communication system.

FIG. 1 illustrates a block diagram of an example free space optical communication system 100. The example free space optical communication system 100 includes at least an optical transmitter 110 and an optical receiver 150, separated by free space. Free space in this application refers to air, vacuum, liquid, or any other unguided light path. Free space optical communication that uses light propagating in free space to wireless transmit data. The optical transmitter 110 directs light 112 in a light path to the optical receiver 150. The optical transmitter 110 and the optical receiver 150 can be located in a single device or in multiple devices and separated by any distance.

The optical transmitter 112 can be a device which includes one or more light-emitting diode (LED), laser (e.g., vertical cavity surface emitting laser, etc.), or other light source and signal conditioning electronics that is used to produce a signal. The optical transmitter 112 converts an electrical signal into optical form, and transmits the resulting optical signal. The optical transmitter 112 can for example include any optical transmitter known in the art.

The optical receiver 150 captures the light from the optical transmitter 110, decode the binary data it is sending and then convert into an electrical signal. The optical receiver 150 includes a photodetector array 151, a combining circuit 152, and a trans-impedance amplifier 153.

The photodetector array 151 includes multiple photodetectors 152, 153, which converts light into electricity using the photoelectric effect. Commonly, photodetectors are made from Indium gallium arsenide. The photodetector is typically a semiconductor-based photodiode. Several types of photodiodes include p-n photodiodes, p-i-n photodiodes, and avalanche photodiodes. Any other type of photodetectors can also be used.

The multiple photodetectors 152, 153 in the photodetector array 151 are able to cover a larger area than a single photodetector. This allows the alignment of the optical transmitter 110 with the optical receiver 150 to have less strict tolerances. If the light path of the light 112 misses one photodetector 152, 153 the light may still be collected by one or more of the other photodetectors 152, 153 on the photodetector array 151. It is to be understood that the photodetector array can have a planar surface or can have a curved surface.

The combining circuit 152 combines current from each of the photodetectors 152, 153 and combines them into a single electrical signal (e.g., sums each current or weighted sum of each current).

The trans-impedance amplifier 153 is a current-to-voltage converter, which can be implemented using an operational amplifier. The trans-impedance amplifier 153 converts the combined current from all the photodetectors 152 into a voltage and amplifies the voltage to create a voltage signal output.

In some other aspects, the optical receiver 150 includes a current amplifier instead of the trans-impedance amplifier 153 and outputs a current signal output.

FIG. 2A illustrates a simplified side 200A of a first example photodiode array of an optical receiver of the optical communication system. An optical transmitter 210 sends a light signal along a light path 212 to a photodetector array 251A.

The photodetector array 251A is coupled to an optical receiver (not shown). The photodetector array 251A includes multiple photodetectors 252 arranged in a matrix. For example, the matrix can be a M×N matrix, such as a 3×3 matrix of nine total photodetectors 252. In some aspects, the photodetectors 252, 253 can be aligned next to each other. In some other aspects, the photodetectors 252, 253 can be separated by space.

The photodetector array 251A allows arrangement optical transmitter and the photodetector array 251 to tolerant to misalignment while remaining adequately functional at communicating optical signals. For example, possible light paths 213 are not perfectly aligned towards a center of the photodetector array 251A, but still allow successful data communication from the optical transmitter 210 to the photodetector array 251A.

FIG. 2B illustrates a simplified side 200B of a second example photodetector array of an optical receiver of the optical communication system. An optical transmitter 210 sends a light signal along a light path 212 to a photodetector array 251B.

The photodetector array 251B is coupled to an optical receiver (not shown). The photodetector array 251B includes multiple photodetectors 252, 253 arranged in a three-dimensional two-layered matrix. For example, a top layer matrix can be a 3×3 matrix of nine photodetectors 252. In this example, a bottom layer matrix can be a 2×2 matrix of four photodetectors 253. Compared to the photodetector array 251A of FIG. 2A, the photodetector array 251B allows a denser arrangement of photodetectors 252, 253. In some aspects, the photodetectors 252, 253 can be aligned next to each other. In some other aspects, the photodetectors 252, 253 can be separated by space.

The photodetector array 251B allows arrangement optical transmitter and the photodetector array 251B to tolerant to misalignment while remaining adequately functional at communicating optical signals. For example, possible light paths 213 are not perfectly aligned towards a center of the photodetector array 251B, but still allow successful data communication from the optical transmitter 210 to the photodetector array 251B.

Figure 3:
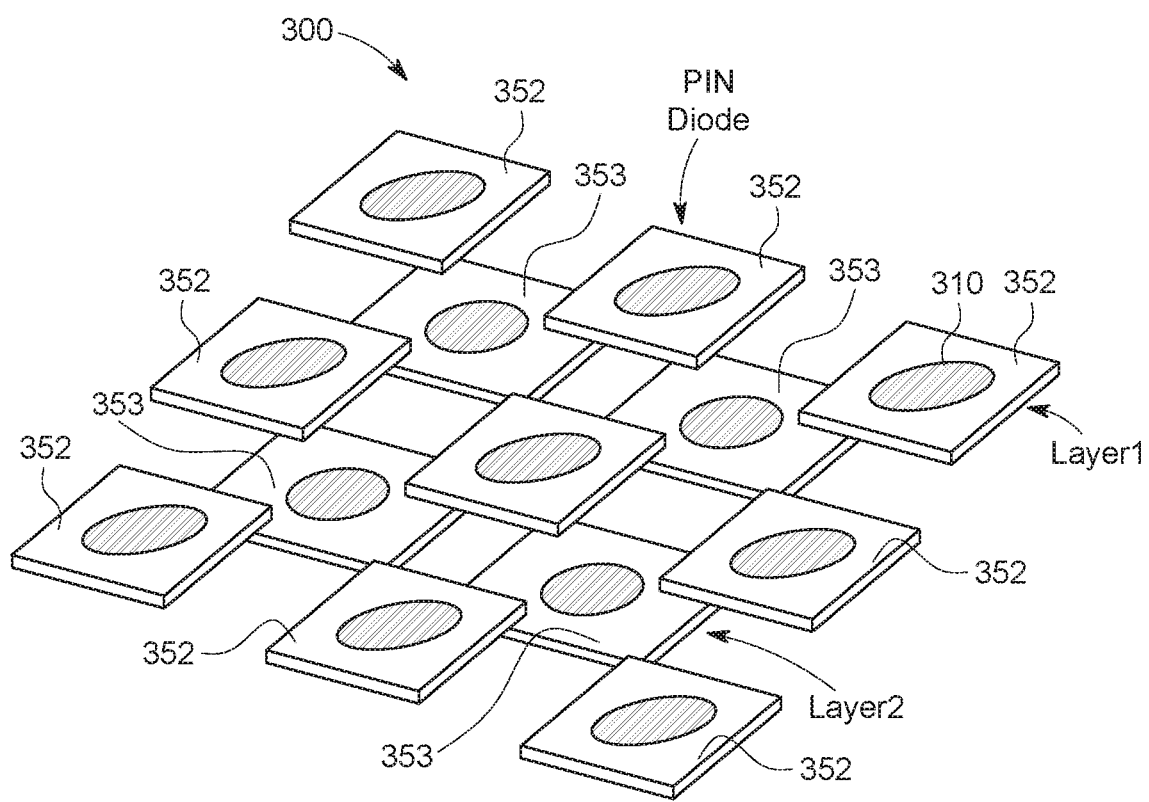
FIG. 3 illustrates a drawing of an example photodetector array of an optical receiver of the optical communication system.

FIG. 3 illustrates a drawing of an example photodetector array 300 of an optical receiver of the optical communication system. The photodetector array 300 is an example of the three-dimensional two-layered matrix of the photodetector array 251B shown in FIG. 2B. A top layer matrix can be a 3×3 matrix of nine photodetectors 352. A bottom layer matrix can be a 2×2 matrix of four photodetectors 353.

Each photodetector 352, 353 has an active area 310, typically in a central area of a surface of the photodetector 352, 353. Only the active area 310 of each photodetector 352, 353 is able to detect light. Generally, the active area 310 does not fully cover the entire surface of the photodetector 352, 353. Therefore, using a three-dimensional two-layered matrix of photodetectors 352, 353, the ratio of total surface area of the active areas 310 versus total surface area of the photodiode array is increased compared to a single-layered matrix of photodetectors 251A as shown in FIG. 2A.

Figure 4:
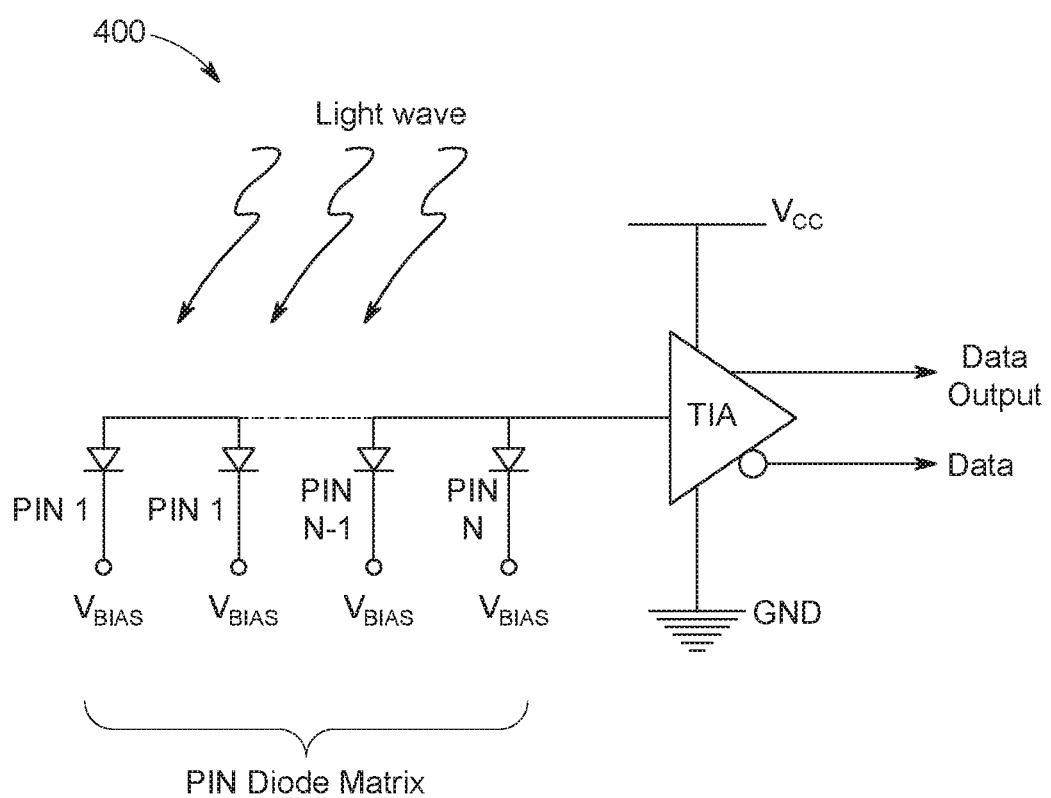
FIG. 4 illustrates a circuit diagram of an example electrical circuit of an optical receiver of the optical communication system.

FIG. 4 illustrates a circuit diagram of an example electrical circuit 400 of an optical receiver of the optical communication system. The example electrical circuit 400 sum electrical currents from each of the photodiodes in the photodiode array of the optical receiver. A transimpedance amplifier (TIA) then converts the current sum into a single voltage signal output.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A free space optical communication system, comprising:
    an optical receiver configured to receive a light beam from an optical transmitter wirelessly in free space, the optical receiver comprising:
        an array of photodetectors configured to receive the light beam and convert optical signals of the light beam into electrical current, wherein the array of photodetector are arranged in a three-dimensional two-layered matrix, wherein each photodetector in the first layer partially overlaps with four photodetectors in the second layer, wherein the first layer is a M×N matrix and the second layer is a (M+1)×(N+1) matrix; and
        an electrical circuit electrically coupled to the array of photodetectors and is configured to combine electrical current from the photodetectors and output a voltage or current signal.

2. The optical communication system of claim 1, wherein the array of photodetectors receives only a single light beam.

3. The optical communication system of claim 1, wherein the electrical circuit comprises a transimpedance amplifier.

4. The optical communication system of claim 1, wherein the electrical circuit is configured to the sum electrical current from the array of photodetectors.

5. The optical communication system of claim 1, wherein the voltage signal output from the electrical circuit is substantially unaffected by movement of optical transmitter in relation to the optical receiver, provided that the light beam is received by one or more photodetector from the array of photodetectors.

* * * * *